A. F. WELCH.
SHORT CIRCUITING DEVICE.
APPLICATION FILED SEPT. 10, 1917.
1,381,044.
Patented June 7, 1921.
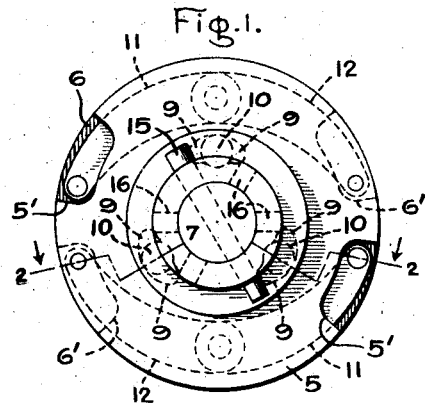
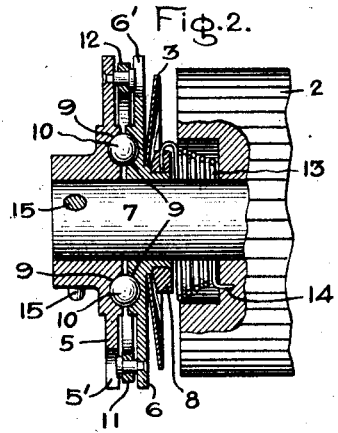
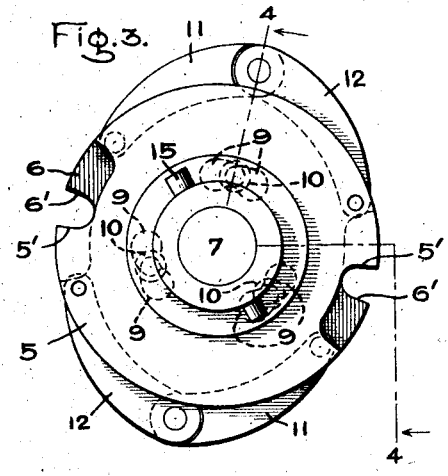
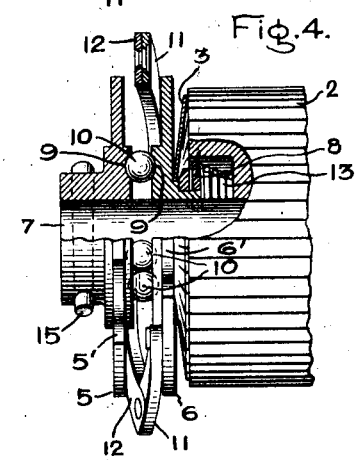
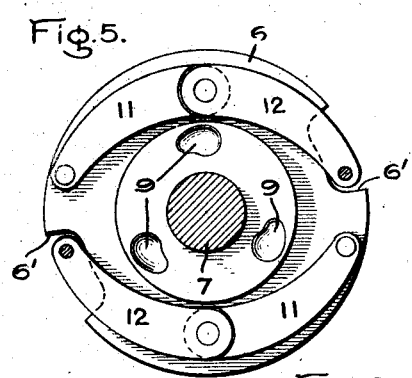
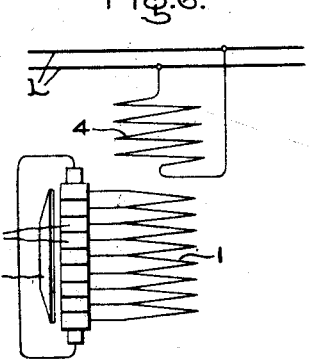
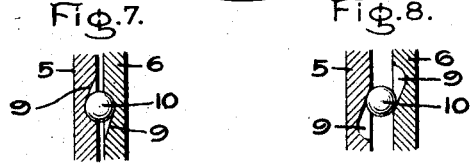
Inventor:
Alfred F. Welch,
by *Albert G. Davis*
His Attorney.

UNITED STATES PATENT OFFICE.

ALFRED F. WELCH, OF FORT WAYNE, INDIANA, ASSIGNOR TO GENERAL ELECTRIC COMPANY, A CORPORATION OF NEW YORK.

SHORT-CIRCUITING DEVICE.

1,381,044.  Specification of Letters Patent.  Patented June 7, 1921.

Application filed September 10, 1917. Serial No. 190,436.

*To all whom it may concern:*

Be it known that I, ALFRED F. WELCH, a citizen of the United States, residing at Fort Wayne, in the county of Allen, State of Indiana, have invented certain new and useful Improvements in Short-Circuiting Devices, of which the following is a specification.

My invention relates to an automatic circuit controlling device for electric motors, and more particularly to a centrifugal governing device for short circuiting the individual coils of the armature by electrically connecting together segments of the commutator after the motor has reached a predetermined speed.

As is well known to those skilled in the art, a single phase alternating current motor will not start from rest when connected to operate as an induction or synchronous motor, unless supplied with a phase splitting device. For this reason, single phase alternating current motors are frequently supplied with commutators whereby the motor can be made to operate as a commutator type motor in starting, while when the motor has been brought up to a predetermined speed, the armature conductors connected with the commutator have their circuits locally closed or short circuited by connecting together segments of the commutator or otherwise, so that the motor may operate as an induction motor.

The object of my invention is to provide an improved centrifugally governed device for short circuiting the commutator segments, which is compact, simple in construction and efficient in operation.

The construction and operation of my invention can best be understood and described in connection with the accompanying drawings, in which Figure 1 is an end elevation of the short-circuiting device as mounted on the motor shaft, adjacent the end of the commutator; Fig. 2 shows a sectional view of the device of Fig. 1 taken on the line 2—2 and looking in the direction of the arrows; Fig. 3 shows an end elevation of the device after the centrifugal means have operated; Fig. 4 shows a view, partly in section on the line 4—4, of the device in the position illustrated in Fig. 3; Fig. 5 is a detail view partly in section; Fig. 6 is a diagram of connections illustrating the function of the invention, and Figs. 7 and 8 are sectional views of a detail of the device.

Referring to the diagram, Fig. 6 of the drawing, the armature coils of a single phase alternating current motor are shown at 1 as being connected to the segments of the commutator 2, which are adapted to be short-circuited by a ring or contact plate 3. The field coil 4 of the motor is shown as being connected across a source of supply L.

My new automatic circuit controlling device comprises two members or disks 5 and 6 mounted on the motor shaft 7, one of which, 5, is fixedly mounted on the shaft and the other of which, 6, is mounted for longitudinal movement thereon. The ring 3 is carried by one of the disks and preferably by the disk 6. These disks are rotated relatively to each other by centrifugal means, and at the same time are displaced axially to bring the short circuiting ring 3 in contact with the end of the commutator. A spring 13 is provided for opposing the relative rotation and the axial movement of the disks 5 and 6. Carried on the hub of the disk 6, on the side adjacent the commutator, but free to turn thereon, is the short-circuiting ring 3 of copper or other suitable material, held in place on the hub of the disk by a washer 8. The disks 5 and 6 are separated by three steel balls, 10, running in opposing cam shaped pockets 9 in the opposing faces of the disks. I speak of these cam shaped pockets as being opposed in the sense that the cam shapes extend in opposite directions in the two disks, as best shown in Figs. 1 and 3.

Located between the disks adjacent the outer periphery, are centrifugal weights comprising two toggles, each formed of two links 11 and 12, the links of each toggle being hinged together at their adjacent ends, while the opposite ends are pivoted one to disk 5 and the other to disk 6. The disks 5 and 6 have portions cut away at 5' and 6' to accommodate the heads of the pins by which the weight links 11 and 12 are pivoted to them, as will be understood from the drawings.

In an aperture in the end of the commutator, is the tapered spiral spring 13 one end of which is anchored in the commutator structure at 14, the other end being anchored in the washer 8 on the hub of disk 6. The spring 13 is both a compression spring acting axially against the disk 6, and also a torsional spring, acting to turn the disk 6 in a direction opposite to that due to the centrifugal pull of the weights 11 and 12 which will be more fully explained hereinafter.

When the motor is at rest, the weights are in toward the shaft, as shown in Figs. 1 and 2, restrained by the spiral torsional spring 13; as the motor, which is started—as has been explained—as an ordinary commutator type motor, accelerates and comes up to a predetermined speed the centrifugal weights are forced outwardly to the position illustrated in Figs. 3 and 4, and in moving outwardly, cause a relative rotation or angular movement of the two disks 5 and 6, inasmuch as the pivoted ends of the links 12 of the weight-toggles are attached to the disk 5 which is fixedly mounted on the shaft 7, and the pivoted ends of the links 11 of the weight-toggles are attached to the disk 6 which is free to revolve on the shaft. Because of the relative rotation of the disks, the balls 10 ride up to the shallow portions of the cam shape pockets 9, as shown in Fig. 8, forcing disk 6 away from disk 5, and this axial movement of disk 6 forces the short-circuiting ring 3 into contact with the end of the commutator 2. The arrangement of the weights is such that the centrifugal pull and the leverage increases materially as the weights move outward, producing a quick snappy action which is facilitated by the comparatively long spiral spring 13 which tends to oppose the rotation of the disk 6, but permits the slight angular movement necessary, without very materially affecting the tension of the spring.

The disk 5 is held in the required angular position on the shaft 7, for adjustment of the spring tension, by a pin 15 extending through the shaft and the hub of the disk 5. To provide for adjusting the tension of the spring 13, a number of radial holes 16 are provided in the hub of the disk 5. To tighten the spring the pin is removed and the whole mechanism rotated against the torsion of the spring and the pin re-inserted.

I have illustrated and described my invention as embodied in what I now consider the best embodiment thereof, but the form and arrangement of the various parts are susceptible of modification without departing from the spirit of my invention, the scope of which I have endeavored to set forth in the following claims.

What I claim as new and desire to secure by Letters Patent of the United States, is:

1. The combination with the armature of an alternating current motor provided with a commutator, of an automatic controlling device therefor comprising two opposing disks, one of said disks being fixedly mounted on the motor shaft, a short circuiting ring carried by one of said disks adjacent the commutator, centrifugally acting means causing relative rotation of said disks, means causing relative axial movement of the disks comprising a plurality of opposing cam shaped pockets in the opposing faces of the two disks, a steel ball for each set of pockets, and a spring interposed between the movable disk and the commutator, the ends of the spring being anchored respectively in the disk and in the commutator.

2. The combination with the armature of an alternating current motor provided with a commutator, of an automatic controlling device therefor comprising a disk fixedly mounted on the motor shaft, a second disk movably mounted on the shaft and interposed between said first disk and the commutator, a short circuiting ring carried by said second disk adjacent the commutator, centrifugally acting means causing relative rotation of said disks, means causing relative axial movement of the disks comprising a plurailty of opposing cam shaped pockets in the opposing faces of the two disks, a steel ball for each set of pockets, and a spring interposed between the movable disk and the commutator, the ends of the spring being anchored respectively in the disk and in the commutator.

3. The combination with the armature of an alternating current motor provided with a commutator, of an automatic controlling device therefor comprising two opposing disks, one of said disks being fixedly mounted and the other movably mounted on the motor shaft, a short circuiting ring carried by one of said disks adjacent the commutator, centrifugally acting weights comprising two pairs of links interposed between the disks on opposite sides of the shaft, the links of each pair being hinged together at their adjacent ends with their opposite ends pivoted one to each disk, the opposing faces of the two disks having a plurality of sets of opposing cam shaped pockets, a steel ball for each set of pockets, and a spring interposed between the movable disk and the commutator, the ends of the spring being anchored respectively in the disk and in the commutator.

4. The combination with the armature of an alternating current motor provided with a commutator, of an automatic controlling device therefor comprising a disk fixedly mounted on the motor shaft, a second disk movably mounted on the shaft and interposed between said first disk and the commutator, a short circuiting ring carried by said second disk adjacent the commutator, centrifugally acting weights comprising two pair of links interposed between the disks on opposite sides of the shaft, the links of each pair being hinged together at their adjacent ends with their opposite ends pivoted one to each disk, the opposing faces of the two disks having a plurality of sets of opposing cam shaped pockets, a steel ball for each set of pockets, a spring interposed between the movable disk and the commutator, the ends of the spring being anchored respectively in the disk and in the commutator, and means for adjusting the tension of the spring.

In witness whereof, I have hereunto set my hand this 5th day of September, 1917.

ALFRED F. WELCH.